United States Patent [19]

Shim et al.

[11] Patent Number: 5,181,184

[45] Date of Patent: Jan. 19, 1993

[54] APPARATUS FOR MULTIPLYING REAL-TIME 2'S COMPLEMENT CODE IN A DIGITAL SIGNAL PROCESSING SYSTEM AND A METHOD FOR THE SAME

[75] Inventors: Dae-Yoon Shim, Seoul; Jong-Sang Lim, Suwon, both of Rep. of Korea

[73] Assignee: Samsung Electronics Co., Ltd., Suwon, Rep. of Korea

[21] Appl. No.: 540,686

[22] Filed: Jun. 20, 1990

[30] Foreign Application Priority Data

Jun. 20, 1989 [KR] Rep. of Korea ............... 1989-8480

[51] Int. Cl.[5] ............................................. G06F 7/52
[52] U.S. Cl. ................................. 364/758; 364/757
[58] Field of Search .................... 364/754, 757-760

[56] References Cited

U.S. PATENT DOCUMENTS 3,956,622  5/1976  Lyon .................................... 364/758
4,736,335  4/1988  Barkan ................................. 364/758
4,761,756  8/1988  Lee et al. ............................ 364/757

Primary Examiner—Tan V. Mai
Attorney, Agent, or Firm—Robert E. Bushnell

[57] ABSTRACT

A pipeline multiplier capable of multiplying 2's complement codes is disclosed. The multiplier operates the multiplication faster than the conventional one by receiving a first predetermined-bit of a multiplier and a second predetermined-bit of multiplicand; producing a multiplier multiplied by sequentially from a least significant bit (LSB) for the times of the second predetermined-bit numbers; logically ORing a most significant bit (MSB) of a preceding partial sum with a MSB of a present partial sum so as to correct the partial sums; and subtracting output of a last partial sum from a value produced by logically NANDing the multiplier and the MSB of the second predetermined-bit of the multiplicand.

12 Claims, 5 Drawing Sheets

APPARATUS FOR MULTIPLYING REAL-TIME 2'S COMPLEMENT CODE IN A DIGITAL SIGNAL PROCESSING SYSTEM AND A METHOD FOR THE SAME

BACKGROUND OF THE INVENTION

The present invention generally relates to a real-time multiplier (high speed multiplier) for use in a digital signal processing system and, more particularly, to a real-time multiplier for multiplying 2's complement code numbers, instead of multiplying straight code data.

In general, a digital signal processing system does not always deal with positive values. For instance, considering a case that an A/D (analog to digital) converter converts an analog input data into a digital signal to obtain a new value by subtracting so-converted digital signals, when a subtraction of A−B is implemented, if the value A is bigger than the value B the output will be positive, where the output data is, of course, valid. However, if the value A is smaller than the value B the output data will be negative, an invalid value.

Therefore, it is understood that the digital code data must be able to deal with not only the positive value (number) but also the negative value. In practice, to meet this end the conventional digital signal processing system adopts various code systems.

To this end, a signed-magnitude code can be used, which has an extra bit for indicating whether the value of the code is positive or negative. This code system is divided into a part for indicating the absolute value of the code and another part for indicating the sign value thereof.

The so-called 2's complement code system can also be used. The basic principle of this 2's complement code is to use the concept of the complement numbers. Being consistently calculable both for addition and subtraction, this code system is widely used in general digital signal processing systems.

In a general digital signal processing system, the same result can be obtained regardless of the code system. When, however, a very high frequency (maybe, tens of MHz) is used for the operating clock, the various characteristics, particularly the speed characteristic of the digital signal processing system is strongly dependent upon the code system. According to the substantial digital signal processing system, the construction can be regarded as a combination of an adder, a subtractor, a multiplier and a divider, all of which is for processing correspondingly the input data code (for example, the straight code, the signed-magnitude code or the 2's complement code).

Of those operations of the adder, the subtractor, the multiplier and the divider presented above, the operations of the multiplier and the divider take a long time, comparatively. Therefore, the system speed is essentially dependent upon the construction of the multiplier and the divider.

It is well known that the 2's complement code system is advantageous in that the negative numbers can be easily expressed and operated so that the consistency for both the addition and subtraction can be used fruitfully in operating the numbers.

Referring to FIGS. 1A and 1B, the addition (X+Y) can be implemented by the circuit of FIG. 1A, while the subtraction (X−Y) by the circuit of FIG. 1B. It is accordingly noted that the difference between the above two circuits lies in the state of the carry input terminal Cin and an inverter 108 included only in the circuit of FIG. 1B. That is, when the carry input signal is 0 the circuit of FIG. 1A implements the addition and, however, when the carry signal is 1 the circuit of FIG. 1B implements the subtraction.

According to the general theory of the binary operation, all the bits of a binary number (addend) are added to the corresponding bits of a binary number to be added so as to perform the addition. However, for the subtraction of two binary numbers, all the bits of an addend are added to the corresponding bits of the 2's complement number of the binary number to be added. It should be noticed in advance that a 2's complement number can be obtained by adding 1 to the 1's complement of a number. This relation can be expressed as follows;

$$A - B = A + (-B) = A + \overline{B} + 1 \tag{1}$$

The formula (1) can be embodied as an adder/subtractor shown in FIG. 2.

In the meantime, in the case where 2'S complement codes are multiplied, the 2'S complement codes are divided into a sign and an absolute value (magnitude of the code) and the absolute value is multiplied first and then the sign is corrected separately.

Considering only the magnitude of the code, it can be obtained by repeatedly implementing the 2's complement addition. However, if the multiplier and the multiplicand are the codes of a big number, then the system must be complicated to implement the addition. To settle this problem, a known apparatus for simplifying the hardware of the system is used in general, in which the apparatus calculates the partial sums by adding the two codes. Then the partial sums are added again to each other to obtain the multiplied result. When adapting such an apparatus, it is the most important drawback that the operation speed is considerably reduced.

There is disclosed another apparatus to speed up the operation, which introduces a pipeline-structured multiplier. In FIG. 3, a conventional magnitude multiplier having the pipeline structure is described. All latches in the drawing are synchronized with the system clock. The latch circuit 301 latches the input value Y of n-bit and the respective adders 310, 313, 317, 323 are all provided with the carry signal Cin of logic low state.

Thereafter, if the input value X of n-bit is latched in the latch circuit 302, the gates 303 and 304 performs the ANDing operation of the value X with the least significant bit (LSB) $Y_0$ and the second LSB bit $Y_1$, respectively. At the same moment, latch 306 latches the input value X. Then, output of the adder 310 is latched at the latch circuit 311 to be added to the output of the AND gate 308, at the adder 313. Thus, the latch output Sn of the latch circuit 316 becomes $$Sn = X \cdot Y_0 + X \cdot Y_1 \cdot 2$$

Further, the partial sum Ps in this case is $$Ps = X \cdot Y_0 + X \cdot Y_1 \cdot 2 + X \cdot Y_2 \cdot 2^2$$

In this way, the partial sums are obtained at each adder amd the result will be transferred to a next stage to be added to the multiplicand.

Such a magnitude multiplier employing the pipeline structure has indeed a strong point of speeding up the operation. It is, however, still disadvantageous in that this magnitude multiplier can not deal with the 2's complement.

SUMMARY OF THE INVENTION

It is therefore an object of the present invention to provide a magnitude multiplier capable of increasing operation speed by employing the principle of the 2's complement.

It is another object of the present invention to provide a magnitude multiplier for operating two 2's complement codes directly, without converting a multiplicand into a 2's complement code.

It is still another object of the present invention to provide an improved magnitude multiplier, the improved magnitude multiplier having a pipeline structure, for multiplying two 2's complement codes.

It is still another object of the present invention to provide a multiplier employing a direct 2's complement multiplication, without separately operating the sign and magnitude of the multiplicand.

It is another object of the present invention to provide a method and a circuit which not only performs the multiplication of 2's complement codes correctly but also make it possible for the pipeline structure to carry out a high-speed operation.

To achieve the above and other objects and features of the present invention, a magnitude multiplier having the pipeline structure includes: a partial sum corrector for receiving a first predetermined-bit of the a multiplier and a second predetermined-bit of the a multiplicand, producing a multiplier multiplied by sequentially from the least significant bit (LSB) for the times of the second predetermined-bit number, and logically ORing the most significant bit (MSB) of a preceding partial sum with the MSB of a present partial sum so as to correct the partial sums; and a 2'S complement corrector for subtracting the result of a last partial sum from a value produced by NANDing the multiplier and the MSB of the second predetermined-bit of the multiplicand.

BRIEF DESCRIPTION OF THE DRAWINGS

For a better understanding of the invention and to show how the same may be carried into effect, reference will now be made, by way of example, to the accompanying diagrammatic drawings, in which.

DETAILED DESCRIPTION OF THE PREFERRED EMBODIMENTS

Figure 3:
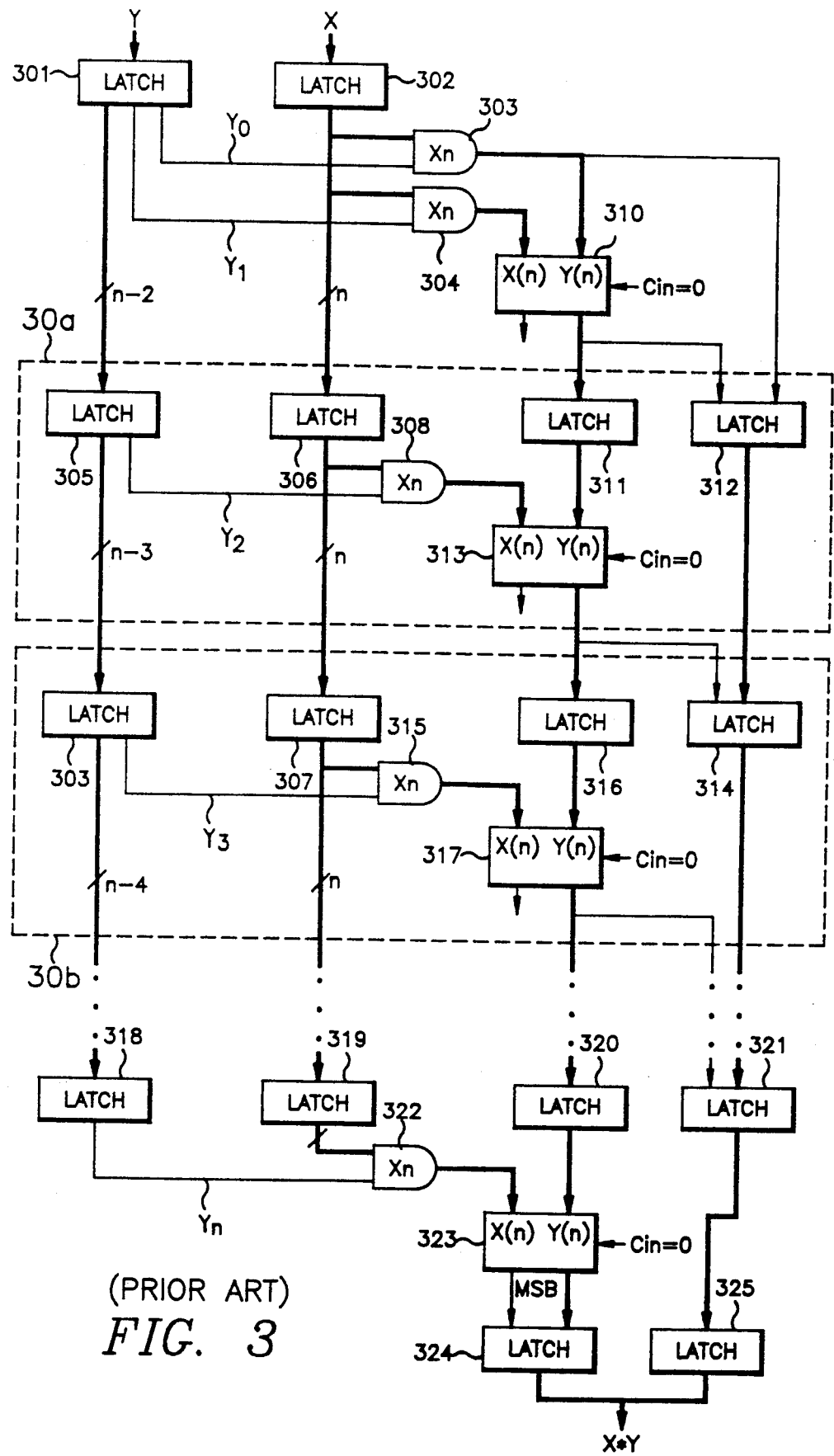
FIG. 3 is a conventional pipeline multiplier.
Figure 4:
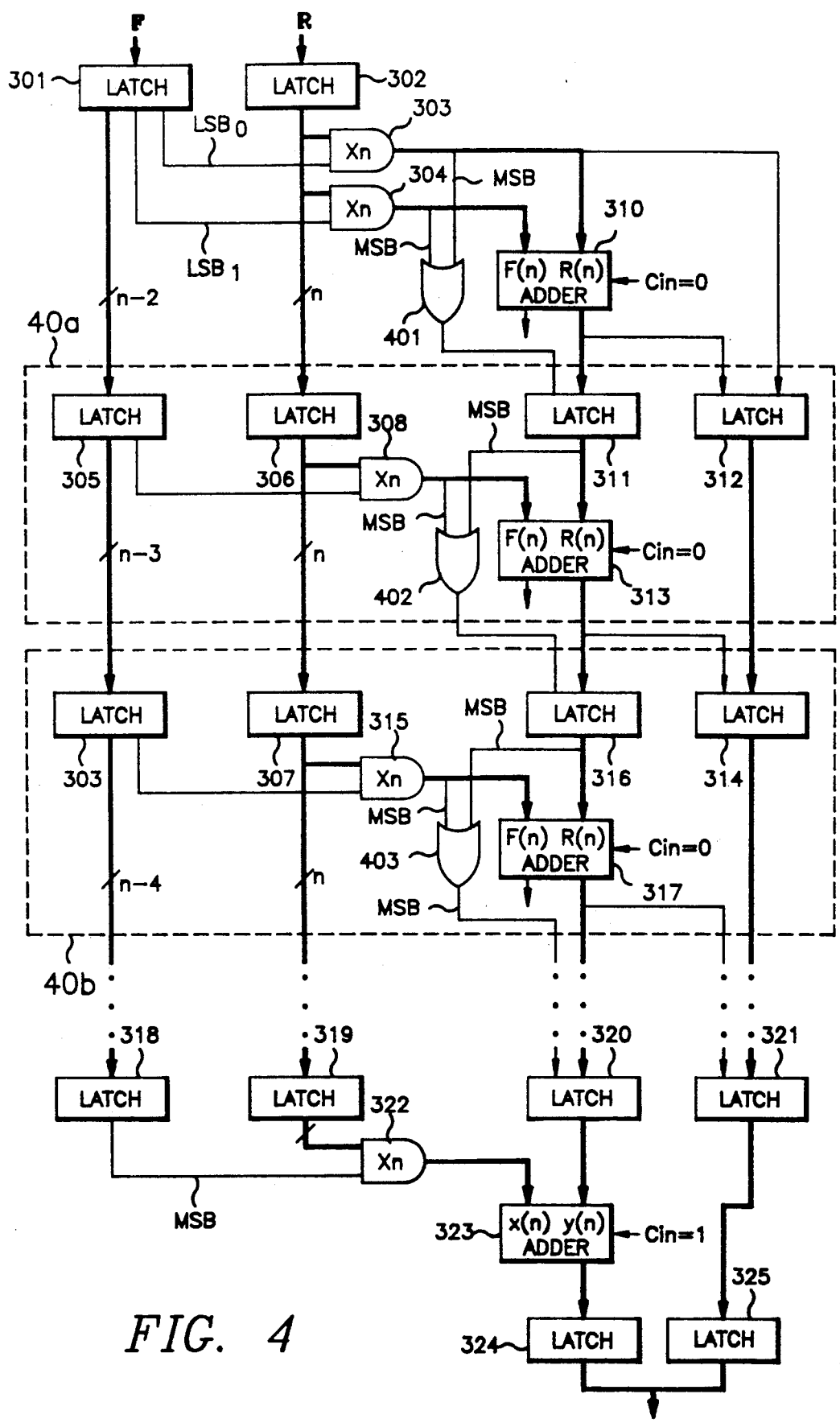
FIG. 4 is a circuit diagram of a pipeline multiplier according to the present invention.

Referring to FIG. 4, there is shown a magnitude multiplier of the invention, in which all the latch circuits, AND gates, and adders represent the like ones shown in FIG. 3. In the drawing, it is different from the conventional magnitude multiplier in that the most significant bit (MSB) values of the output of the AND gates 303, 304 are applied to an OR gate 401, the output of the OR gate 401 is applied to the latch 311, and that the MSB output from the AND gate 308 and the MSB output from the latch 311 are applied to an OR gate 402 to correct a partial sum therein. In the same way, the MSB output from the latch 318 and the MSB output from the latch 319 are provided to a NAND gate 322, output of the NAND gate 322 being coupled to the input terminals of the adder 323 of which other input terminals is coupled to the output terminals of the latch 320, so as to correct the 2's complement codes. In this way, a subtracting operation for the outputs of the NAND gate 322 and the latch 320 will be implemented.

Furthermore, a plurality of sections the same as the section 40a which is composed of the latch circuits 305, 306, 311, 312, the AND gate 308, the OR gate 402 and the adder 313 can be successively coupled to the respective corresponding output terminals of the section 40b.

Figure 5:
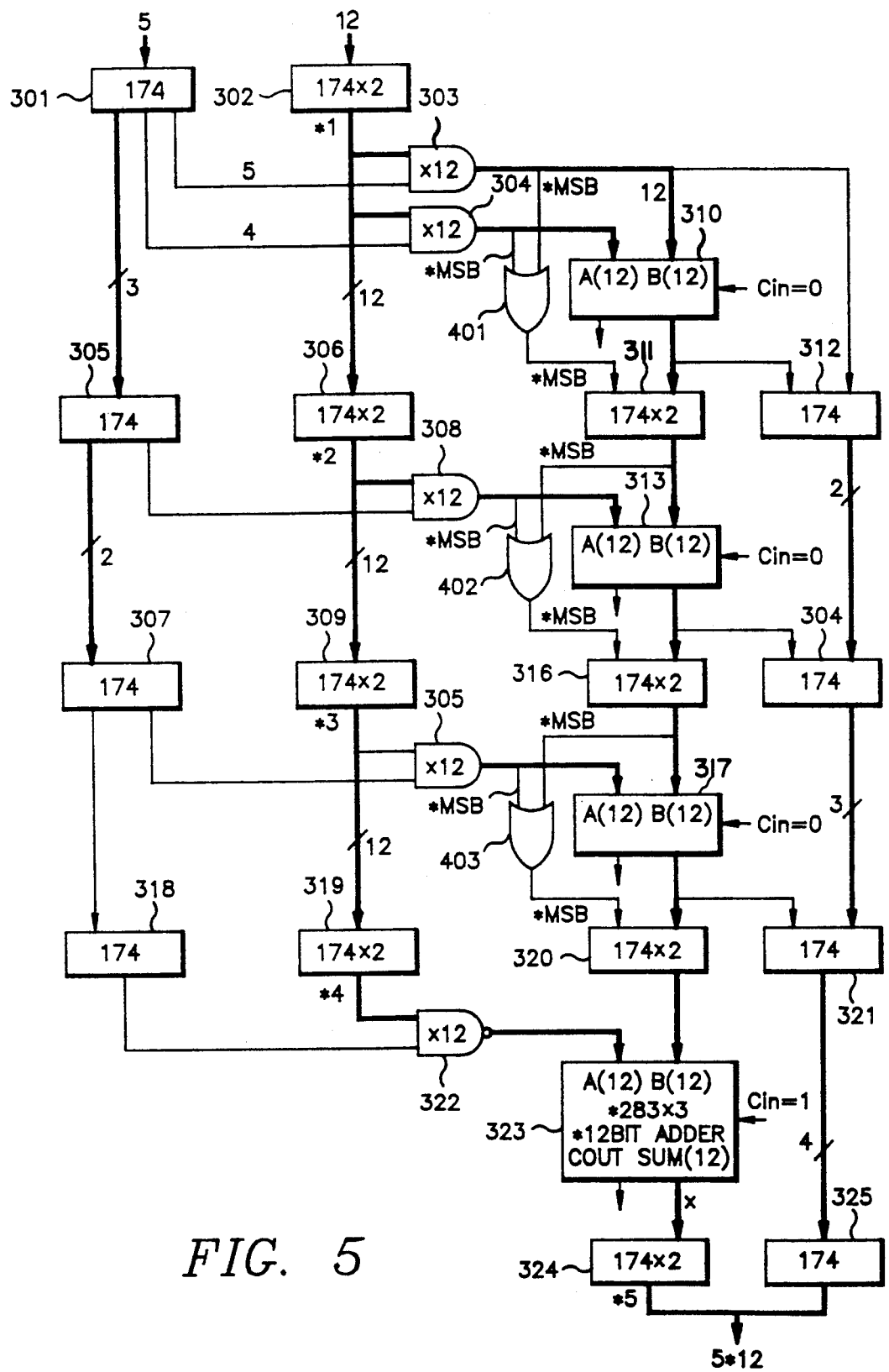
FIG. 5 is an illustration for showing the multiplication of $5 \times 12$ according to the present invention.

Referring now to FIG. 5, a specifically illustrated embodiment of the invention is given, in which a multiplicand X is having 12-bits and a multiplier Y having 5-bits. This embodiment shows an example of multiplying the two values X and Y.

For the convenience of explaining the invention, a theory of converting from the straight code to the 2's complement code will be shortly described hereinbelow. When it is considered that a multiplicand $|F$ is multiplied by a multiplier $|R$, both being in 2's complement form, the respective values can be rewritten as follows $$1F = F_{n-1}, F_{n-2}, \ldots, F_2, F_1, F_0 \qquad (2)$$

(for example, $F = 101001$)

$$1R = G_{n-1}, G_{n-2}, \ldots, G_2, G_1, G_0 \qquad (3)$$

(for example, $1R = 011001$)

The magnitudes (absolute values) of the above 2's complement codes are $$||1F|v = -F_n - 2 \cdot 2^{n-1} + \sum_{i=0}^{n-2} F_i 2^i \qquad (4)$$

$$||1R|v = -R_{n-1} \cdot 2^{n-1} + \sum_{i=0}^{n-2} R_i 2^i \qquad (5)$$

In the above formulas, if the MSB bit is 0 the 2's complement code is positive, while the MSB is 1 the 2's complement code is negative. Therefore, the values of the 2's complement codes can be calculated as follows $$Fv = -2^5 + 2^3 + 1 = -23 \text{(Negative)} \qquad (6)$$

$$Rv = 2^4 + 2^3 + 1 = 25 \text{(Positive)} \qquad (7)$$

In similar to the operation of FIG. 4, the multiplier of FIG. 5 having a pipeline structure, performs repeatedly the adding operation, as described above, so as to implement a desired multiplication. If the multiplicand $|F$, and the multiplier $|R$ are converted into the 2's complement codes, the values are calculated as follow $$1R \times 1F = (1F) \times \left( -R_{n-1} \cdot 2^{n-1} + \sum_{i=0}^{n-2} R_i 2^i \right) \qquad (8)$$

-continued
$$= 1F(-R_n - 1) \cdot 2^{n-1} + \ldots + 1F \cdot R_1 2^1 + 1F \cdot R_0 2^0$$

where the $R_i$ is of either 0 or 1. Therefore, in order to achieve the multiplication of two 2's compliment codes, the multiplicand |F is repeatedly added to itself, after shifted at every addition, according to the value of $R_i$. As far as this operation is concerned, it is the same as adding operation of the straight codes. However, due to a specific characteristic of the 2's complement codes, when operating the MSB bits, the multiplying operation of the 2's complement codes becomes different from that of the straight codes. Namely, if the value of the MSB bit, $R_{n-1}$, is 0, then there is no problem in implementing the multiplication of the 2's complement, as in case of implementing the straight codes. But, if the value of the MSB bit is 1, then it is needed for the multiplier to subtract the MSB bit, i.e., 1 in this case, from the partial sums added up to that time.

Figure 1A:
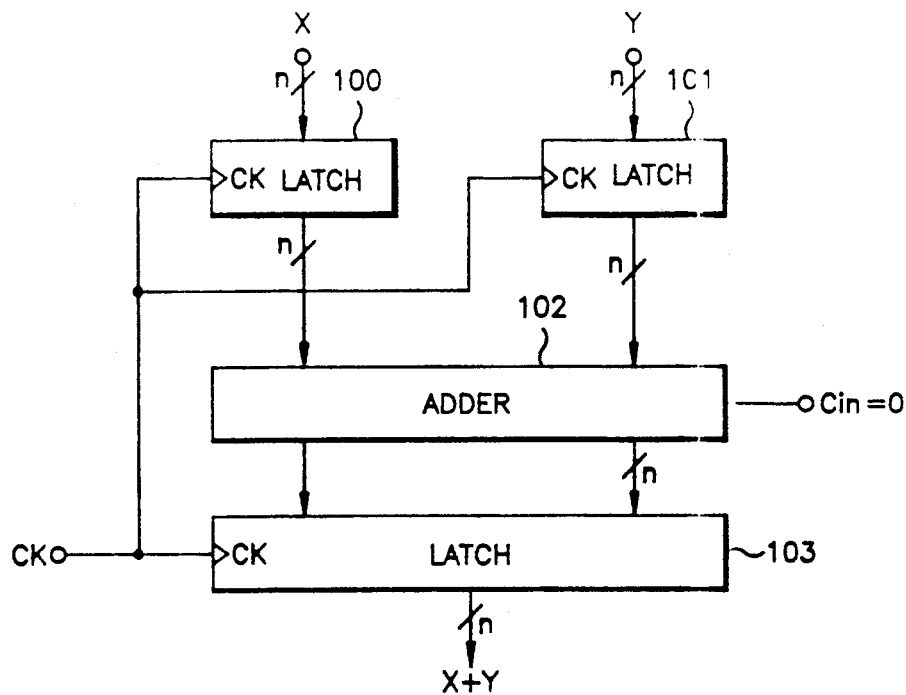
FIGS. 1A and 1B are respectively an adder and a subtractor for operating 2's complement codes.
Figure 1B:
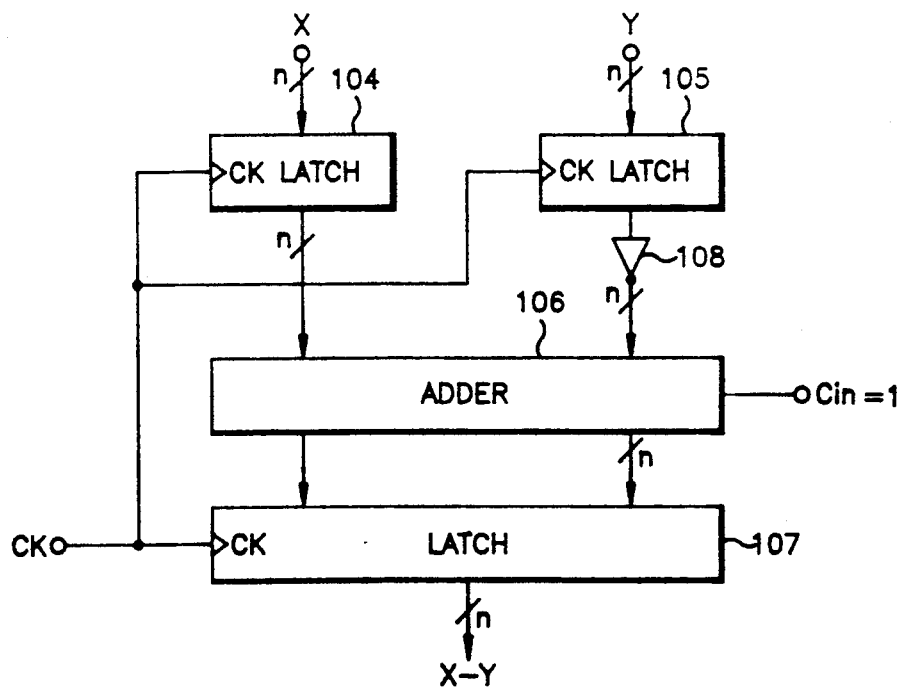
Figure 2:
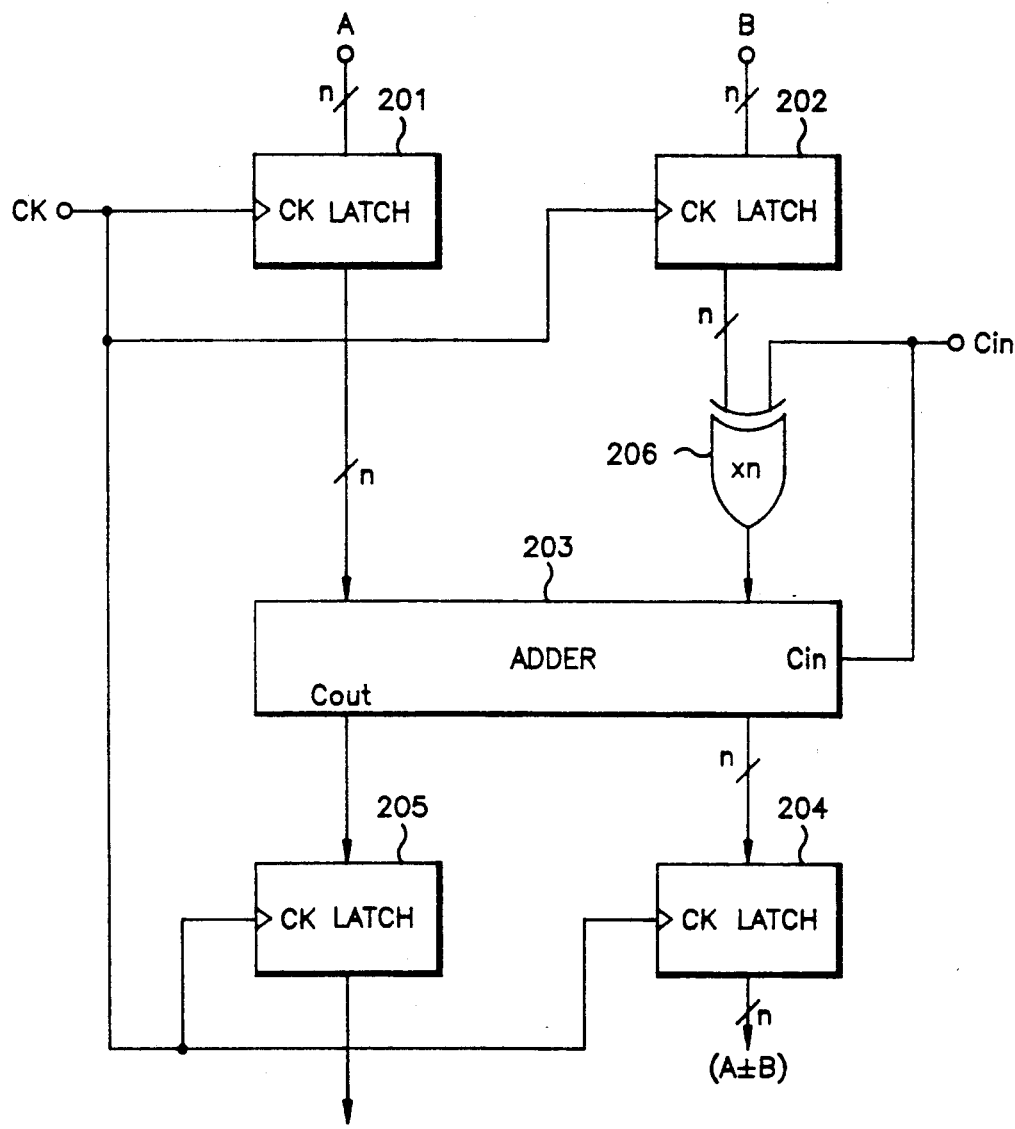
FIG. 2 is a conventional adder/subtractor for general use.

According to the basic theory of the 2's complement code, in order to get a 2's complement code, the entire bits of a code should be inverted first (which is a 1's complement), and then to the inverted result is added a binary 1. As shown in FIG. 1B, therefore, the subtraction is carried out by inverting the entire bits of a multiplicand's code and by applying a carry signal of the logic 1 to the carry terminal Cin.

Based upon this principle, the correction of the 2's complement codes can be carried out by, as illustrated in FIG. 4, NANDing the outputs of the latches 318, 319 at the NAND gate 322 and adding the output of the NAND gate 322 to the output of the latch 321.

Hereinbelow, in order to consider the correction of partial sums produced by the OR gates 401, 402 and 403, an example will be taken to 4-bit 2's complement codes. That is, if the 2's complement codes are given as |F=1100 and |R=1011, $$Fv = -2^3 + 2^2 = -4$$

$$Rv = -2^3 + 2^1 + 2^0 + = -5$$

Thus, the multiplication is $$1F \times 1R = -4 \times -5 = 20$$

```
      1 1 0 0
    × 1 0 1 1
    ─────────
      1 1 0 0  ⎤
      0 0 0 0  ⎦ F
    ─────────
      1 1 0 0
      1 1 0 0
    ─────────
    x x x x x x x x
```

For this operation, the multiplier and the multiplicand are respectively logically multiplied by the AND gates 303, 304, respective outputs of the above gates being provided to the adder 310, so that the output added with each other may be produced by way of the latch 311.

Thus, by means of using the specific characteristics of the 2's complement codes, the multiplication can be implemented for two codes by adding the two codes. At this time, a sign extension should be made, which is remarked as F in the above formula. The sign extension can be expressed again

```
  ← ┐
  1 1 1 0 0
+ 0 0 0 0 0
  ─────────
  1 1 1 0 0  ── Partial Sum
```

The result of the above calculation is added to the adder 313 so as to be added to the multiplicand logically ANDed with the second bit of the multiplier. Then, the MSB's of the latch 311 and the AND gate 308 are logically ORed by the OR gate 402 and the output of the OR gate 402 is provided to the latch 316, the output of which is

```
   1 1 1 1 0 0    ── Partial Sum
+  1 1 0 0 0 0
   ───────────
  1 1 0 1 1 0 0   ── Partial Sum
  └─ Overflow
```

It is noted from the above exemplary operations that when the sign extension is made, an overflow is produced. However, since the overflow is used as it is at the next stage and the sign extension is naturally made, it is not necessary to correct the codes.

In this way, if n-bit multiplier and multiplicand are respectively applied to the latches 301 and 302, the LSBO (least significant bit) and LSBI of the multiplier respectively provided to the AND gates 303, 304 so as to be logically ANDed (multiplied) with the n-bit multiplicand, the outputs of the AND gates each being added with each other by the adder 310. In this embodiment, the OR gate 401 is used to correct the partial sum, produced by adding of the outputs from the AND gates 303, 304. The outputs of the adder 310 and the OR gate 401 are latched at the latch 311. Consequently, the same operation will be repeated until the MSB of the multiplier is processed. Finally, the MSB from the latch 318 and n-bit multiplicand passed through the latch 319 are logically NANDed by the NAND gate 322.

Next, the subtraction between the output of the NAND gate 322 and the output of the latch 320 will be implemented by adding the above outputs by means of the adder 323, while carry terminal Cin is receiving an inverting logic 1, contrarily to the inverting logics of carry terminals Cin of the adders 310, 313, 317. Therefore, as the result of the above operations, a multiplication of F× R will be successfully performed.

On the contrary to the above case of not requiring for the correction of the 2's complement, another example requiring for the correction of the 2's complement will now be taken. If a partial sum is for example a binary l1XXXX (where X represents a "don't care"), there can exist two cases. That is, the one is a logic 1 which indicates a requirement of multiplication. The other is a logic 0 which indicates an unnecessariness of multiplication. In practice, when the logic is 0, there is no difficulty in multiplying the codes. However, when the logic is 1, the operation of "a partial sum +a value to be multiplied" is expressed as follows, according to the characteristics of the multiplier.

```
  1 1 X X X X
+ ⌊0 0 X X X
  0 1 1 X X X
```

As can be understood from the above operation, the result of the partial sum operation has caused the sign of the code to be inverted from a negative number to a positive number. In order to correct this miscalculation, the OR gates 401, 402, 403 are used. Furthermore, if the result of the partial sum operation inverts the sign from the positive to the negative, the OR gates 401, 402, 403 again produce the MSB, by which the multiplication can be accomplished.

Referring to FIG. 5, another example is shown in which the multiplicand is 12 and the multiplier is 5. Namely, to be in short, in order to process the 2's complement codes, the inventive multiplier subtracts output of the NAND gate 322 of the last stage, which is to process the MSB bit of the 2's complement code, from the output of the latch 320, the carry input terminal being provided with a given logic signal to allow the adder to perform the subtraction. In operation of the partial sum, in order to correct the overflow, the MSB of the partial sum is logically added to the MSB of the multiplicand which is provided through the AND gates 304, 308, 315 according to the corresponding bits of the multiplier. Thus, the multiplication can be performed by the process of converting the MSB bit.

Although operations are enumerated by 2'S complement in a concrete way, those objects of the present invention can be easily realized by those skilled in the art covering this field, if the NAND gate 322 of FIG. 4 is turned into an AND gate as existing one and the carry Cin of the adder 323 is set at "0" when one is a 2'S complement code and the other is a straight code instead of two 2'S complement multiplication in the case where MSB is corrected in the digital signal processor.

Consequently, the present invention is effective in that it makes a correct calculation of 2'S complement code and achieves high-speed operation, which is a merit of pipeline, making it possible to calculate 2'S complement which is impossible in the pipeline magnitude multiplier by correcting the MSB of partial sum and the MSB of multiplying number.

While the invention has been particularly shown and described with reference to a preferred embodiment, it will be understood by those skilled in the art that modifications in detail may be made without departing from the spirit and scope of the invention.

What is claimed is:

1. A pipeline multiplier, capable of multiplying 2's complement codes, said pipeline multiplier comprising:
    a plurality of serially connected partial sum generating means each receiving preceding partial sums and generating present partials sums;
    partial sum correcting means for sequentially receiving bits comprising a multiplier and a multiplicand, producing first values by sequentially multiplying said bits by said multiplicand, in logic circuits, and logically combining, in first logic gate circuits, a most significant bit of preceding partial sums with a most significant bit of said first values so as to correct present partial sums; and
    a 2's complement correcting means for subtracting a present partial sum generated by a last one of said plurality of serially connected partial sum generating means from a second value produced by logically combining, in a second logic gate circuit, said multiplicand with the most significant bit of said multiplier.

2. An apparatus as set forth in claim 1, wherein said partial sum correcting means comprising:
    ORing means for receiving preceding partial sums generated by said plurality of serially connected partial sum generating means and for logically ORing the respective most significant bits; and
    latch means for receiving an output of said ORing means and partial sums to produce corrected partial sums.

3. An apparatus as set forth in claim 2, wherein said ORing means consists of two less OR gates than a number of bits in said multiplier.

4. A pipeline multiplier having a plurality of latch circuits and adders, and including means for multiplying 2's complement codes, comprising a plurality of serially connected partial sum generating means, a first one of said plurality of serially connected partial sum generating means comprising:
    first latch means for receiving a multiplicand;
    second latch means for receiving a multiplier and for providing a least significant bit and a next significant bit of said multiplier,
    first means and second means for respectively combining said least significant bit and said next significant bit with said multiplicand;
    an adder for producing a present partial sum from the outputs of said first combining means and said second combining means;
    gate means for producing a correction signal from a most significant bit of said output of said first combining means with a most significant bit of said output of said second combining means; and
    partial sum correcting means for receiving said present partial sum and said correction signal and generating a corrected partial sum.

5. The device of claim 4, further comprising:
    a 2'complement correcting circuit comprising NAND gate means for NANDing said multiplicand and the most significant bit of said multiplier and a subtractor for subtracting a final partial sum generated by a last one of said plurality of serially connected partial sum generating means from the output of said NAND gate means.

6. A pipeline multiplier having a plurality of latch circuits and adders, and including means for multiplying 2's complement codes, and having a plurality of stages for producing a sequence of partial sums, at least one of said plurality of stages comprising:
    first latch means for receiving a multiplicand;
    second latch means for receiving a multiplier and for providing a selected bit of said multiplier, said selected bit being for each of said plurality of stages;
    AND gate means for combining said selected bit with said multiplicand to generate a value;
    an adder for producing a present partial sum by adding said value to a preceding partial sum generated by a preceding one of said plurality of states;
    OR gate means for producing a correction signal from the most significant bit of said value and the most significant bit of said preceding partial sum; and partial sum correcting means for receiving said present partial sum and said correction signal to generate a corrected partial sum.

7. The device of claim 6, further comprising:
a 2's complement correcting circuit for receiving a corrected partial sum generated by a final stage of said plurality of stages as a final partial sum, comprising NAND gate means for NANDing said multiplicand and a most significant bit of said multiplier, and a subtractor for subtracting said final partial sum from the output of said NAND gate means.

8. A pipeline multiplier capable of multiplying two numbers each in 2's complement format, said pipeline multiplier comprising:
a plurality of serially connected partial sum generating means, each comprising a first latch, a second latch, and an adder for sequentially generating partial sums by adding, in said adder, preceding partial sums received from said first latch to a multiplier received from said second latch multiplied by a selected bit of bits comprising said multiplicand, said selected bit being different for each of said plurality of serially connected partial sum generating means;
a plurality of partial sum correcting means each associated with a different one of said plurality of serially connected partial sum generating means for correcting partial sums by logically combining, in logic gate circuits, a most significant bit of said preceding partials sum with a most significant bit of said multiplier multiplied by said selected bit; and
2's compliment correcting means for subtracting a last partial sum generated by a last one of said plurality of serially connected partial sum generating means from a value produced by logically combining said multiplier and a most significant bit of said multiplicand.

9. The pipeline multiplier claimed in claim 8, wherein said each of said plurality of partial sum correcting means comprises:
an OR gate for performing said ORing function and generating a corrected bit and
a latch for receiving said corrected bit and preceding partial sums to generate corrected partial sums.

10. The pipeline multiplier claimed in claim 9, wherein said pipeline multiplier consists of ((number of bits in said multiplicand)- 2) OR gates.

11. A method for multiplying two 2's complement numbers in a pipeline multiplier by sequentially adding partial sums, at least one of said partial sums determined by a method comprising:
receiving a preceding partial sum and latching said preceding partial sum in a latch;
multiplying, in a first logic gate circuit, a bit of a multiplier selected from bits comprising said multiplier by a multiplicand to generate a value, said bit selected depending on which of sad partial sums is being calculated;
generating a correction bit by logically combining, in a second logic gate circuit, a most significant bit of said preceding partial sum with a most significant bit of said value; and
generating a corrected partial sum by latching said correction bit and the result of adding said value to said preceding partial sum.

12. The method claimed in claim 11, wherein said at least one of said partial sums determined by said method further comprising:
subtracting a final partial sum of said sequential partial sums from a value produced by logically NANDing said multiplicand and a most significant bit of said multiplier.

* * * * *